Figure 1:
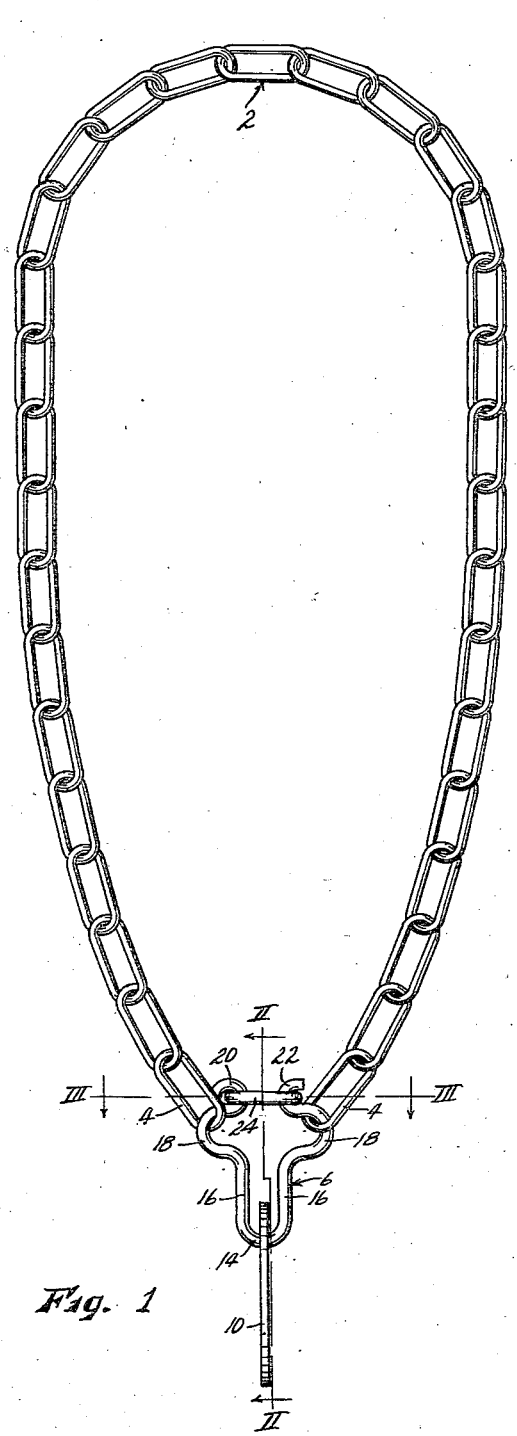

Jan. 28, 1958   G. W. BAKER   2,821,034
IDENTIFICATION DEVICE FOR LIVE STOCK
Filed Oct. 19, 1954

INVENTOR.
Glenn W. Baker
BY Hamilton & Hamilton
Attorneys.

United States Patent Office 2,821,034
Patented Jan. 28, 1958

2,821,034
IDENTIFICATION DEVICE FOR LIVE STOCK

Glenn W. Baker, Kansas City, Mo., assignor to Stone Manufacturing and Supply Company, Kansas City, Mo., a corporation of Missouri Application October 19, 1954, Serial No. 463,162

2 Claims. (Cl. 40—3)

This invention relates to new and useful improvements in identification devices for livestock animals, and has particular reference to a link operable to join the ends of a chain passing about the neck of the animal, and to support an identification tag.

The principal object of the present invention is the provision of a link-type fastener of the character above described which, while extremely rugged and secure, may nevertheless be opened easily for application of the device to or removal from an animal, or for the changing of the identification tag, with no tool other than a pair of common pliers.

Another object is the provision of a link fastener of the character described which provides that the identification tag carried thereby will always be disposed in such a position as to be clearly readable from both sides of the animal.

Other objects are simplicity and economy of construction, efficiency and dependability of operation, and adaptability of the link fastener to be used with nearly any type of chain and identification tag.

Figure 2:
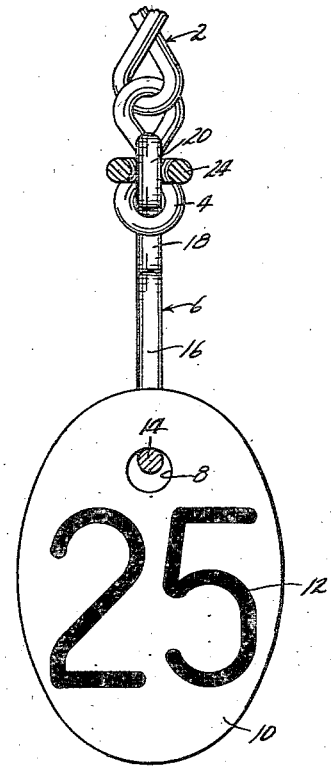
Figure 3:
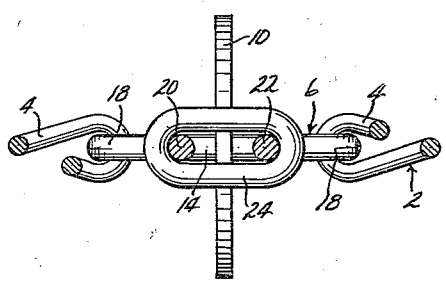

With these objects in view, as well as other objects which will appear in the course of the specification, reference will be had to the drawing, wherein:

Fig. 1 is a front elevational view of an identification device for livestock, laid out in substantially the position assumed when applied to the neck of an animal, Fig. 2 is an enlarged fragmentary sectional view taken on line II—II of Fig. 1, and Fig. 3 is an enlarged sectional view taken on line III—III of Fig. 1.

Like reference numerals apply to similar parts throughout the several views, and the numeral 2 applies to a linked chain arranged in Fig. 1 in substantially the position it would assume when placed about the neck of an animal. Each of the end links 4 of said chain is engaged in a connector link 6. Said connector link also extends through a perforation 8 formed in a planar identification tag 10, said tag being usually formed of metal for good wear characteristics and having suitable identification indicia, such as indicated at 12 in Fig. 2, imprinted on both sides thereof.

The body portion of connector link 6 comprises a single length of heavy spring wire having the central portion thereof bent to form a lower loop 14 with parallel side reaches 16. Each of said side reaches, adjacent the upper or free end thereof, is offset outwardly to form a bight 18 in which the end links 4 of chain 2 are respectively engaged. The extreme upper end portions of the reaches 16, immediately above the bights 18, are formed respectively to present an eye 20 and an outwardly opening hook 22. The entire body portion of the connector link, including the loop 14, reaches 16, bights 18, eye 20 and hook 22, lies in a single plane. A closed, elongated fastener link 24 is permanently secured for pivotal movement in eye 20, and is adapted to be engaged in hook 22, when said hook and eye are sprung resiliently closer together.

The parallel side reaches 16 of the connector link 6, just below bights 18, form a convenient place at which a pair of common pliers may be applied to draw the hook and eye closer together to permit the engagement or disengagement of link 24 in hook 22. This represents a distinct advantage over connector links now in common usage, which are peripherally split rings of the key-ring type, and which due to the substantial weight and strength required are very difficult to manipulate. The disposition of the tag 10 in the extended lower portion provides that the link will be maintained by gravity in its normal upright position as shown. The engagement of links 4 in bights 18 of the connector provides that the tension of chain 2 will hold the connector link 6 in the plane of the loop of chain 2, and hence also will retain identification tag 10 in a plane at right angles to the plane of the chain loop. Thus the identification tag is held at all times in such a position that it may be read easily from either side of the animal. It will be noted also that the fastener link 24 is sufficiently wide in a direction at right angles to the plane of body portion 6, and that eye 20 and hook 22 are sufficiently large in the plane of body portion 6, that in conjunction said fastener link, hook, and eye form an enlargement which cannot pass through either of the end links 4 of chain 2, no matter how said end links may be arranged. This prevents disarrangements of the connector link relative to chain 2, as might occur, for example, if both of end links 4 were to engage in one of bights 18.

While I have shown and described a specific embodiment of my invention, it will be apparent that certain changes of structure and operation could be made without departing from the spirit of the invention as defined by the scope of the appended claims.

What I claim as new and desire to protect by Letters Patent is:

1. An identification device for livestock comprising a linked chain adapted to be passed about the neck of a livestock animal, a connector link joining the end links of said chain, and a planar identification tag having indicia on both sides thereof and having a perforation therethrough through which said connector link is threaded, said connector link comprising a U-shaped body member formed of resilient wire and having approximately parallel side arms, each of said side arms being offset outwardly adjacent its free end to form a bight in which one of the end links of said chain is engaged, and the free end portions of said side arms being formed respectively to present an eye and an outwardly opening hook, and a fastener link pivoted in said eye and operable to be moved into engagement with said hook only when said side arms are urged resiliently closer together.

2. The structure as set forth in claim 1 wherein said fastener link is disposed in a plane at right angles to the general plane of the connector link and is sufficiently broad transversely to said connector link plane to preclude its passage through the end links of said chain when the plane of the former is disposed transversely to the axis of said end links, and wherein said hook and eye are each sufficiently enlarged in the plane of the connector link to prevent their passage through said end links when the plane of the connector link is disposed transversely to the axes of said end links.

References Cited in the file of this patent
UNITED STATES PATENTS

| | | |
|---|---|---|
| 389,037 | Wilkinson | Sept. 4, 1888 |
| 509,529 | Harris | Nov. 28, 1893 |
| 881,152 | Renshaw | Mar. 10, 1908 |
| 1,927,732 | Bailey | Sept. 19, 1933 |
| 2,331,636 | Stone | Oct. 12, 1943 |